(12) United States Patent
Lin et al.

(10) Patent No.: US 10,119,584 B2
(45) Date of Patent: Nov. 6, 2018

(54) DISK BRAKE DEVICE WITH DISK PAD GUIDING STRUCTURE

(71) Applicant: Lee Chi Enterprises Co., Ltd., Changhua, Changhua County (TW)

(72) Inventors: Bing Hong Lin, Changhua (TW); Chien I Hung, Changhua (TW)

(73) Assignee: Lee Chi Enterprises Co., Ltd., Changhua (TW)

( * ) Notice: Subject to any disclaimer, the term of this patent is extended or adjusted under 35 U.S.C. 154(b) by 0 days.

(21) Appl. No.: 15/648,544

(22) Filed: Jul. 13, 2017

(65) Prior Publication Data

US 2018/0023644 A1   Jan. 25, 2018

(51) Int. Cl.

| | | |
|---|---|---|
| *F16D 125/36* | (2012.01) | |
| *F16D 65/097* | (2006.01) | |
| *F16D 55/2265* | (2006.01) | |
| *F16D 65/00* | (2006.01) | |
| *F16D 67/02* | (2006.01) | |
| *F16D 55/228* | (2006.01) | |
| *F16D 65/18* | (2006.01) | |
| *F16D 125/60* | (2012.01) | |
| *F16D 121/14* | (2012.01) | |

(Continued)

(52) U.S. Cl.
CPC ....... *F16D 65/0972* (2013.01); *F16D 55/228* (2013.01); *F16D 55/2265* (2013.01); *F16D 65/0075* (2013.01); *F16D 65/183* (2013.01); *F16D 67/02* (2013.01); *F16D 2055/0075* (2013.01); *F16D 2121/14* (2013.01); *F16D 2125/40* (2013.01); *F16D 2125/60* (2013.01)

(58) Field of Classification Search
CPC ............... F16D 55/2265; F16D 55/228; F16D 65/0972; F16D 65/0075; F16D 65/183; F16D 2125/36; F16D 2125/60
USPC .................................................. 188/72.7, 72.9
See application file for complete search history.

(56) References Cited

U.S. PATENT DOCUMENTS

| | | | | |
|---|---|---|---|---|
| 5,979,609 A | * | 11/1999 | Tsai ......................... | B62L 1/00 188/26 |
| 6,230,850 B1 | * | 5/2001 | Huang ..................... | B62L 1/00 188/24.12 |

(Continued)

FOREIGN PATENT DOCUMENTS

| | | |
|---|---|---|
| CN | 201720777980.5 | 6/2017 |
| TW | 447440 U | 7/2001 |

*Primary Examiner* — Thomas W Irvin
(74) *Attorney, Agent, or Firm* — Alan D. Kamrath; Kamrath IP Lawfirm, P.A.

(57) ABSTRACT

A disk brake device has a first component, a universal set, and a second component. The first component has a first assembling hole axially formed through the first component. The universal set is mounted in the first assembling hole and has a base having a supporting protrusion and a first clutch. The first clutch has a fixed plate and a movable plate. The fixed plate has a flange embedded in and fixed to the first assembling hole. The movable plate is capable of axially reciprocating and has a feeding shaft and a recess. The feeding shaft is mounted through the fixed plate. The recess is mounted on the supporting protrusion and contacts the supporting protrusion in a point-contact relationship. The second component is fastened to the first component and has a second assembling hole formed through the second component and assembled by a second clutch.

17 Claims, 9 Drawing Sheets

(51) Int. Cl.
*F16D 125/40* (2012.01)
*F16D 55/00* (2006.01)

(56) References Cited

U.S. PATENT DOCUMENTS

| | | | | |
|---|---|---|---|---|
| 6,250,438 B1 * | 6/2001 | Chern | ............... | B62L 1/00 188/72.3 |
| 6,394,236 B1 * | 5/2002 | Matsuishita | ............... | B62L 1/00 188/24.22 |
| 6,520,297 B1 * | 2/2003 | Lumpkin | ............... | B60T 11/046 188/24.15 |
| 6,557,671 B1 * | 5/2003 | Kirimoto | ............... | B60T 11/046 188/26 |
| 6,607,057 B2 * | 8/2003 | Lumpkin | ............... | B60T 11/046 188/18 A |
| 6,959,790 B2 * | 11/2005 | Huang | ............... | B60T 8/3225 188/24.19 |
| 8,662,260 B2 * | 3/2014 | Baldeosingh | ............... | F16D 65/12 188/72.7 |
| 8,770,353 B2 * | 7/2014 | Usui | ............... | F16D 65/18 188/106 F |
| 9,168,974 B2 * | 10/2015 | Harris | ............... | B62L 1/005 |
| 9,751,586 B2 * | 9/2017 | Nakakura | ............... | B62L 1/00 |
| 9,869,356 B2 * | 1/2018 | Zhou | ............... | F16D 55/2265 |

* cited by examiner

DISK BRAKE DEVICE WITH DISK PAD GUIDING STRUCTURE

BACKGROUND OF THE INVENTION

1. Field of the Invention

The present invention relates to a braking technique of bicycles, and more particularly to a disk brake device with a disk pad guiding structure.

2. Description of Related Art

A conventional disk brake device has a brake disk, a caliper, and two disk pads. The brake disk is connected to a hub of a wheel of a bicycle. The caliper is connected to a bicycle frame and has two caliper arms. The two disk pads are respectively connected to the two caliper arms of the caliper. The two disk pads contact the brake disk to slow down or stop the wheel. Whether each disk pad is parallel to the brake disk may determine value of friction area between each disk pad and the brake disk and even affects the time period for braking. Adjusting disk pads for keeping each disk pad parallel to the brake disk is a difficult and time-consuming task. Without a specialized gadget, even a skillful expert with abundant experience may hardly complete the adjusting task of disk pads.

TW Patent Publication No. 447440 discloses a conventional disk pad guiding structure of disk brake device which mainly has a left main body and a right main body. The left main body is connected to an adjusting mount with a curved groove. The curved groove of the left main body contacts a protruding curve surface of a supporting base which is disposed at a left side of the left main body. The right main body is linked to a screw arbor with a curved groove. The curved groove of the screw arbor contacts a protruding curve surface of a supporting mount base disposed at a right side of the right main body. The two disk pads are respectively connected to the two supporting bases. The two curved grooves respectively match the two protruding curve surfaces for self adjusting to guide the two disk pads to be parallel with a brake disk. However, the conventional disk pad guiding structure, with each curved groove contacting a corresponding protruding curve surface in a face contact, results in consuming dynamic energy of the two disk pads to respectively slide relative to the left main body and the right main body and delays the time for the two disk pads to clamp the brake disk.

To overcome the shortcomings of the disk pad guiding structure of the conventional disk brake device, the present invention provides a disk brake device with a disk pad guiding structure to mitigate or obviate the aforementioned problems.

SUMMARY OF THE INVENTION

The main objective of the present invention is to provide an improved means to guiding disk pads for shortening the time period of braking.

The disk brake device comprises a first component, a universal set, and a second component. The first component has a first assembling hole axially formed through the first component. The universal set is mounted in the first assembling hole and has a base having a supporting protrusion and a first clutch. The first clutch has a fixed plate and a movable plate. The fixed plate has a flange embedded in and fixed to the first assembling hole. The movable plate is capable of axially reciprocating and has a feeding shaft and a recess. The feeding shaft is mounted through the fixed plate. The recess is disposed on the supporting protrusion and contacts the supporting protrusion in a point-contact relationship. The second component is fastened to the first component and has a second assembling hole formed through the second component and assembled by a second clutch.

Other objects, advantages, and novel features of the invention will become more apparent from the following detailed description when taken in conjunction with the accompanying drawings.

DETAILED DESCRIPTION OF PREFERRED EMBODIMENTS

Figure 1:
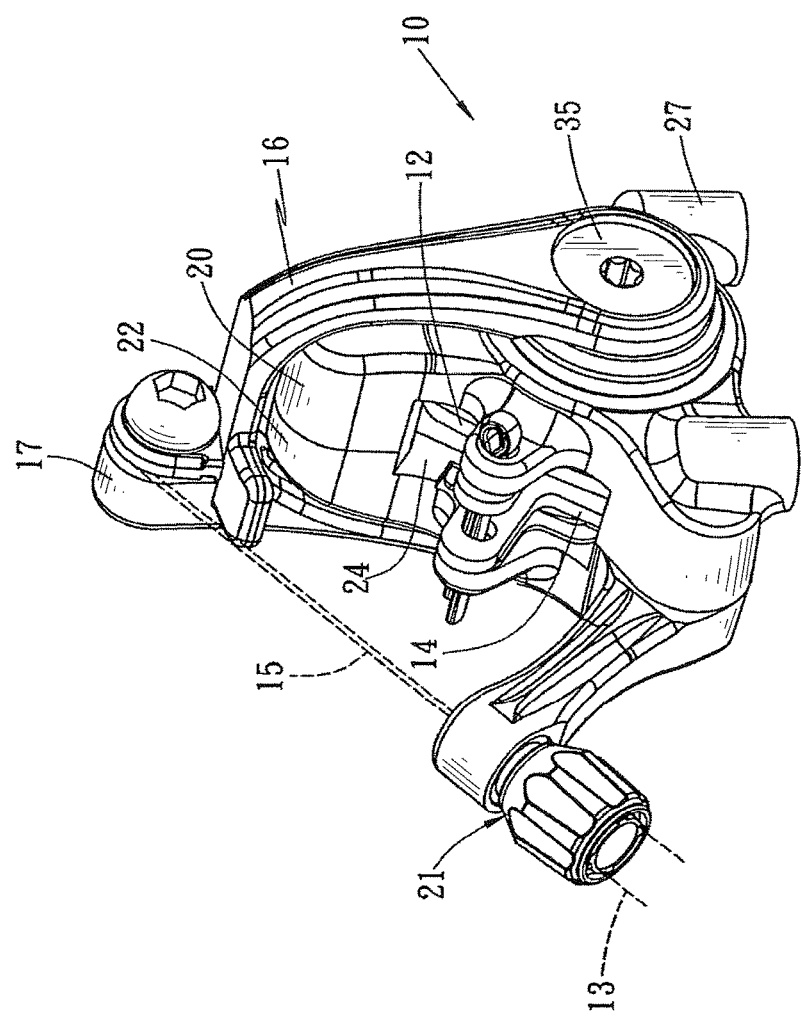
FIG. 1 is a perspective view of a first embodiment of a disk brake device with a disk pad guiding structure in accordance with the present invention.

The present invention provides a disk brake device with a disk pad guiding structure.

With reference to FIGS. 1 to 8, a disk brake device 10 of a first embodiment in accordance with the present invention has a first brake pad 12, a second brake pad 14, a first component 20, a second component 22, and a caliper 16.

Figure 3:
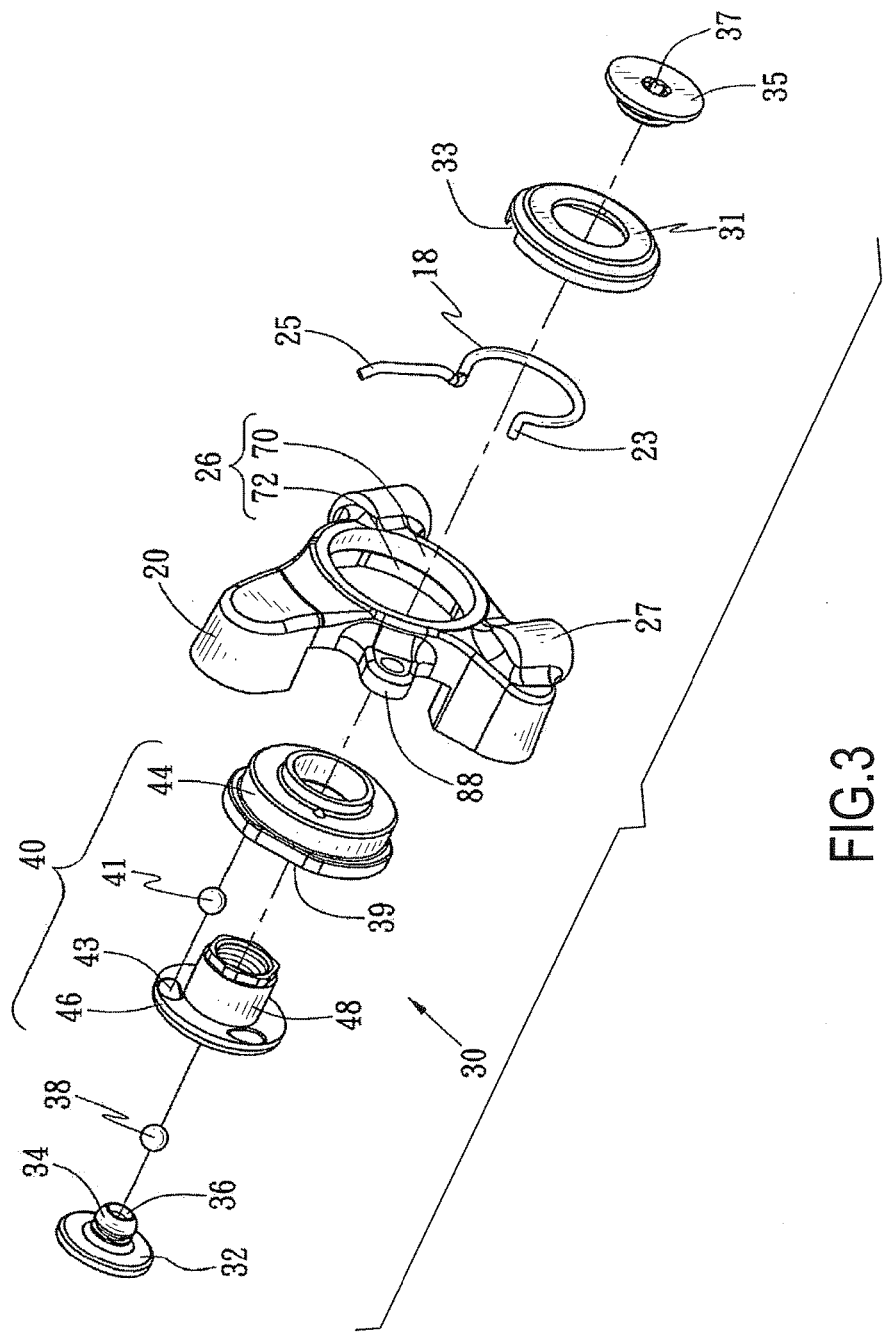
FIG. 3 is a partially exploded perspective view of the disk brake device in FIG. 1.
Figure 5:
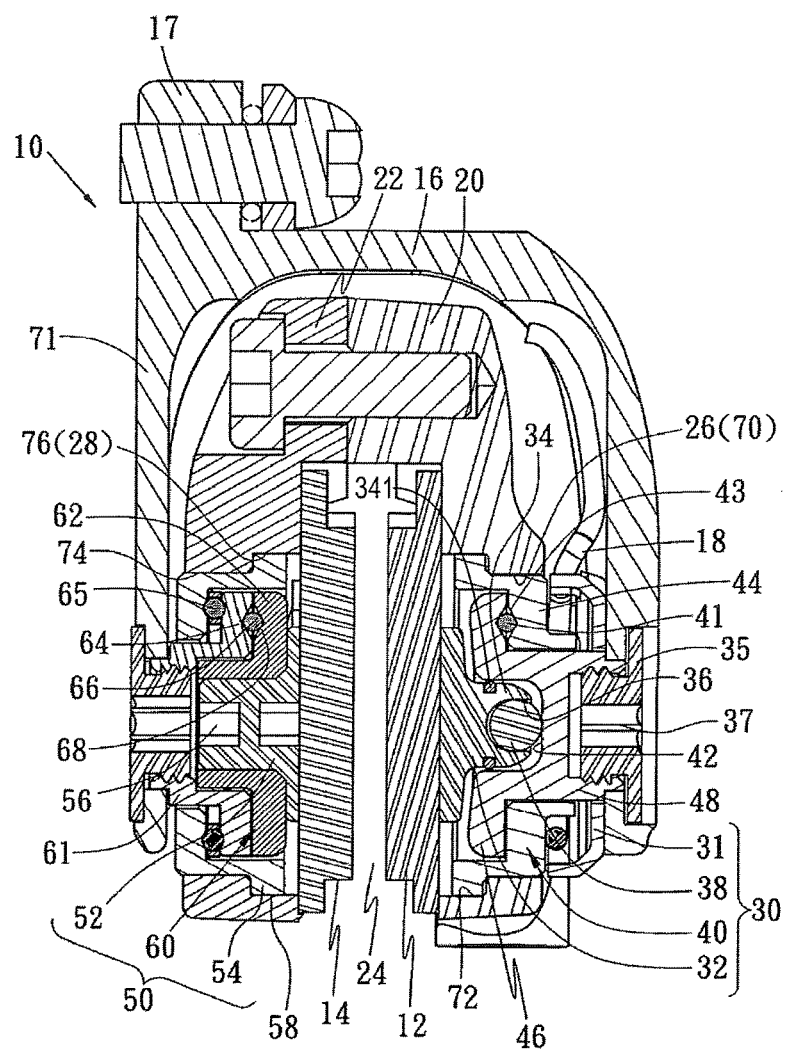
FIG. 5 is a cross sectional side view of the disk brake device in FIG. 1.

With reference to FIGS. 1, 3, and 5, the first component 20 has an axial direction, an outline, two sides, a middle position, a depression, a first assembling hole 26, two linkage portions 27, and a first connecting portion 88. The outline of the first component 20 is similar to a triangle. The two sides of the first component 20 are opposite each other in the axial direction of the first component 20. The depression of the first component 20 is formed at one of the two sides of the first component 20. The first assembling hole 26 is axially formed through the middle position of the first component 20. The first assembling hole 26 consists of a round hole 70 and a non-circular hole 72. The round hole 70 and the non-circular hole 72 of the first assembling hole 26 communicate with each other. The non-circular hole 72 of the first assembling hole 26 is disposed at one of the two sides of the first component 20 that is adjacent to the depression of the first component 20. The two linkage portions 27 and the first connecting portion 88 are formed at an outer portion of the first component 20. The first component 20 may be connected to a bicycle frame by the two linkage portions 27.

Figure 4:
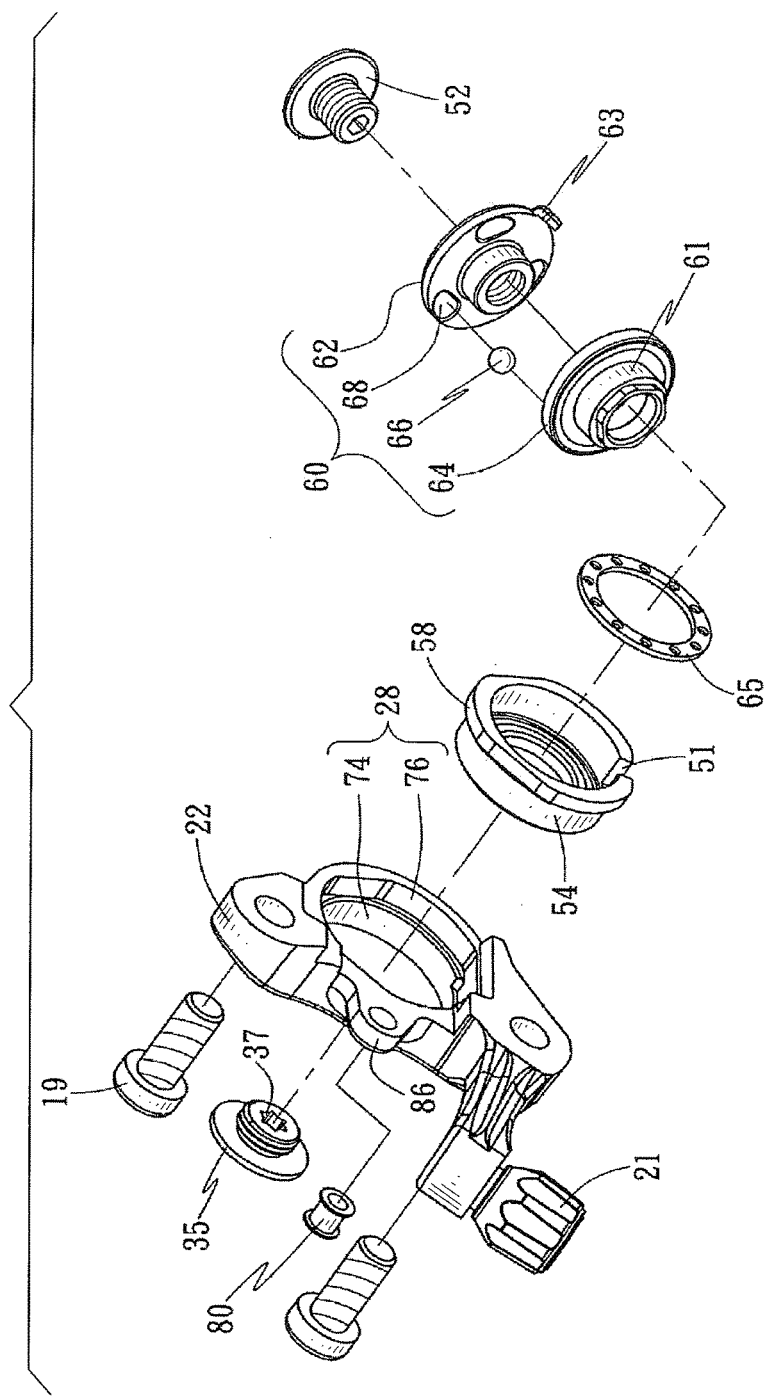
FIG. 4 is another partially exploded perspective view of the disk brake device in FIG. 1.

With reference to FIGS. 1, 4, and 5, the second component 22 has an outline, two sides, a middle position, a depression, a limiting unit 21, a second assembling hole 28, and a second connecting portion 86. The outline of the second component 22 is similar to the outline of the first component 20. The two sides of the second component 22 are opposite each other in the axial direction of the first component 20. The depression of the second component 22 is formed at one of the two sides of the second component 22. Two bolts 19 are mounted through the second component 22 and are screwed with the first component 20 to fasten the first component 20 with the second component 22. The second assembling hole 28 is formed through the middle position of the second component 22, coaxially aligns with the first assembling hole 26, and is assembled by an adjusting unit 50. The second assembling hole 28 consists of a round hole 74 and a non-circular hole 76. The round hole 74 and the non-circular hole 76 of the second assembling hole 28 communicate with each other. The non-circular hole 76 of the second assembling hole 28 is disposed at one of the two sides of the second component 22 that is adjacent to the depression of the second component 22.

The two depressions of the first component 20 and the second component 22 join together to form a clamping space 24. The first disk pad 12 and the second disk pad 14 are both disposed in the clamping space 24. Furthermore, a brake disk may be disposed between the first disk pad 12 and the second disk pad 14.

With reference to FIGS. 3, 4, 7, and 8, the second connecting portion 86 and an elastic sheet 82 are mounted through a hollow riveting unit 80. A pin 84 is mounted through the first connecting portion 88 of the first component 20, the first disk pad 12, the second disk pad 14, and the riveting unit 80 and can prevent the first disk pad 12 and the second disk pad 14 from respectively demounting from the first component 20 and the second component 22. On the other hand, the first disk pad 12 and the second disk pad 14 may be respectively removed from the first component 20 and the second component 22 during removal of the pin 84.

Figure 2:
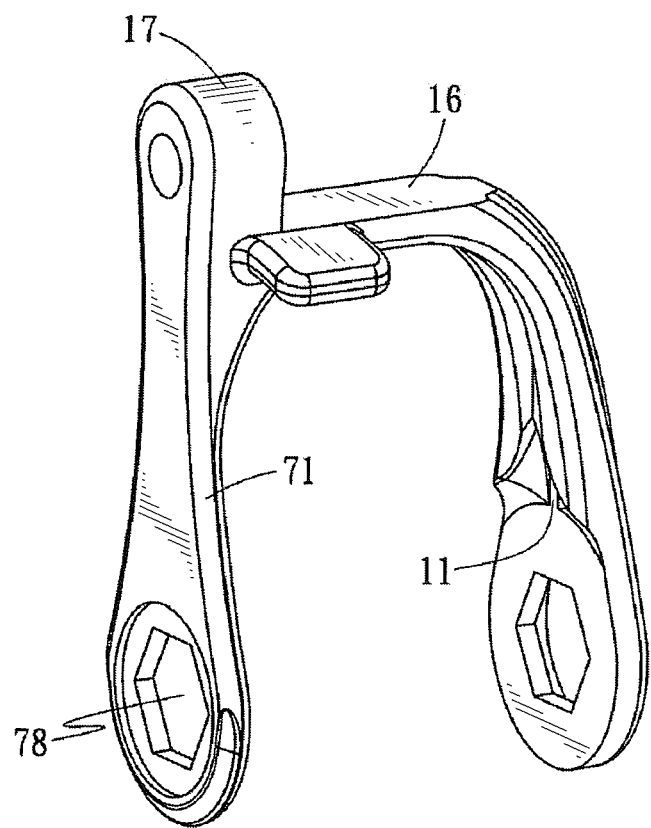
FIG. 2 is a perspective view of a caliper of the disk brake device in FIG. 1.

With reference to FIGS. 1, 2, and 5, the caliper 16 has a U-shaped outline and two caliper arms 71. Each one of the two caliper arms 71 has an end portion and a hexagonal hole 78 formed through the end portion of the caliper arm 71. The two hexagonal holes 78 of the two caliper arms 71 are coaxial. One of the two caliper arms 71 has a groove 11 facing to the other one of the two caliper arms 71. The other one of the two caliper arms 71 has a fastening portion 17 extending opposite the hexagonal hole 78 of the other one of the two caliper arms 71. The limiting unit 21 and the fastening portion 17 are disposed at a same side of the caliper 16 and are disposed at a same side of the disk brake device 10. A brake cable 15 is mounted through the liming unit 21 and is fixed to the fastening portion 17. The limiting unit 21 may block an outer sleeve 13. The caliper 16 may be dragged by the brake cable 15 and sweeps toward the limiting unit 21 by a certain degree to achieve a braking function.

With reference to FIGS. 3 and 5, the universal set 30 has a base 32, a ball 38, and a first clutch 40. The base 32 is disposed behind the first brake pad 12. Then, the first brake pad 12 is disposed between the second brake pad 14 and the base 32. The base 32 has a supporting protrusion 34 extending opposite the first brake pad 12. The supporting protrusion 34 has an end portion with a spherical outline and a ball socket 36 formed at the end portion of the supporting protrusion 34. An O-ring 341 is mounted on and around a surface of the supporting protrusion 34 and is disposed at a middle section of the supporting protrusion 34. The ball 38 is embedded in the ball socket 36 and partially protrudes out from the ball socket 36.

The first clutch 40 is capable of reciprocating along the axial direction of the first component 20. The first clutch 40 has a fixed plate 44, a movable plate 46, three rolling balls 41, and six conical recesses 43. The fixed plate 44 is an annular cover. The fixed plate 44 has a through hole and a flange 39. The through hole is formed through a middle position of the fixed plate 44. The flange 39 of the fixed plate 44 has a non-circular outline designed according to the non-circular hole 72 of the first assembling hole 26 of the first component 20. The flange 39 of the fixed plate 44 fits in the non-circular hole 72 of the first assembling hole 26 of the first component 20 for keeping the fixed plate 44 from rotating relative to the first component 20. The fixed plate 44 is partially mounted through the round hole 70 of the first assembling hole 26 of the first component 20. The flange 39 of the fixed plate 44 abuts against a bottom of the non-circular hole 72 at where the round hole 70 is formed through for keeping the fixed plate 44 from detaching from the first assembling hole 26 of the first component 20.

The movable plate 46 has two opposite sides, a feeding shaft 48, and a recess 42. The feeding shaft 48 and the recess 42 are respectively disposed at the two opposite sides of the movable plate 46. The feeding shaft 48 has a free end with a hexagonal cross section matching the hexagonal hole 78 of one of the two caliper arms 71 of the caliper 16. The recess 42 extends into the feeding shaft 48 and has a plane bottom and an inner surrounding surface. The movable plate 46 is assembled to the fixed plate 44. The free end of the feeding shaft 48 is mounted through the first assembling hole 26 and fits in the hexagonal hole 78 of the aforementioned caliper arm 71, and makes the movable plate 46 and the caliper 16 able to move together. The caliper 16 may drive the movable plate 46 to reciprocate.

A protecting cover 35 is screwed with the free end of the feeding shaft 48 and has an adjusting hole 37. The adjusting hole 37 is formed in a middle position of the protecting cover 35 and has a polygonal outline. A tool such as an Allen key may be inserted into the adjusting hole 37 to adjust the protecting cover 35. The protecting cover 35 may axially move to form a tolerance that allows the feeding shaft 48 to move axially without interfering with the movable plate 46 that reciprocates relative to the first component 20.

The supporting protrusion 34 of the base 32 and the ball 38 of the universal set 30 are inserted into the recess 42 of the movable plate 46. The ball 38 contacts the plane bottom of the recess 42 in a point-contact relationship. The O-ring 341 mounted on and around the surface of the supporting protrusion 34 contacts the inner surrounding surface of the recess 42 in a linear contact relationship. The movable plate 46 is supported by the supporting protrusion 34 of the base 32 in a point-contact relationship and a linear contact relationship to allow the base 32 to universally rotate relative to the movable plate 46. The first brake pad 12 assembled to the base 32 may universally rotate relative to the first component 20. The end portion of the supporting protrusion 34 may be formed spherically and the ball socket 36 of the supporting protrusion 34 and the ball 38 may be omitted. The spherical end portion of the supporting protrusion 34 may contact the plane bottom of the recess 42 in a point-contact relationship.

The six conical recesses 43 are divided into three pairs. Two conical recesses 43 of each pair are respectively formed in the fixed plate 44 and the movable plate 46 and face to each other. The three rolling balls 41 are respectively retained in the three pairs of conical recesses 43. Each one of the three rolling balls 43 is capable of rotating between the fixed plate 44 and the movable plate 46. The first clutch 40 further has an elastic unit 18 and a cover 31. The elastic unit 18 is mounted on the feeding shaft 48 and exposed out of the first component 20. The cover 31 is mounted on a portion of the feeding shaft 48 that extends out of the first component 20 and covers the elastic unit 18. The cover 31 is blocked by one of the two caliper arms 71 of the caliper 16 and cannot detach from the movable plate 46.

The elastic unit 18 is a metal strip and has a middle section, an axial section 23, and an operating section 25. The middle section of the elastic unit 18 has a C-shaped outline and is mounted on the feeding shaft 48. The axial section 23 is connected to the middle section of the elastic unit 18, and is inserted in the fixed plate 44 for functioning as a positioning point of the elastic unit 18. The operating section 25 is supported by the axial section 23. The operating section 25 is mounted through an opening 33 formed in the cover 31 and is inserted in the groove 11 of one of the two caliper arms 71 of the caliper 16. The operating section 25 provides an active force for the caliper 16 to move relative to the first component 20 and the second component 22.

With reference to FIGS. 4 and 5, the adjusting unit 50 has an adjusting mount 52, a fixed mount 54, and a second clutch 60. The second clutch 60 is assembled between the adjusting mount 52 and the fixed mount 54. The second clutch 60 is capable of reciprocating axially. The adjusting mount 52 is disposed behind the second brake pad 14. Additionally, the second brake pad 14 is disposed between the first brake pad 12 and the adjusting mount 52. The adjusting mount 52 has a protruding pillar screwed with the second clutch 60. The protruding pillar of the adjusting mount 52 has a socket 56 axially formed in the protruding pillar.

The fixed mount 54 is an annular cover and has a flange 58 and a guiding opening 51. The flange 58 of the fixed mount 54 has a non-circular outline matching the non-circular hole 76 of the second assembling hole 28 of the second component 22. The flange 58 of the fixed mount 54 fits in the non-circular hole 76 of the second assembling hole 28 of the second component 22 for keeping the fixed mount 54 from rotating relative to the second component 22. The fixed mount 54 is partially mounted through the round hole 74 of the second assembling hole 28 of the second component 22. The flange 58 of the fixed mount 54 abuts against a bottom of the non-circular hole 76 at where the round hole 74 is formed through for keeping the fixed mount 54 from detaching from the second assembling hole 28 of the second component 22. The guiding opening 51 is disposed at and formed through the flange 58 of the fixed mount 54.

The second clutch 60 has a main plate 62, a minor plate 64, three rolling balls 66, and six conical recesses 68. The main plate 62 is annular and has an edge and a limiting block 63 formed at the edge of the main plate 62. The main plate 62 is inserted in the fixed mount 54. In addition, the limiting block 63 fits in the guiding opening 51 of the fixed mount 54 to keep the main plate 62 from rotating relative to the fixed mount 54 but able to axially reciprocate relative to the fixed mount 54. The adjusting mount 52 is screwed with the main plate 62. An Allen key may be inserted in the socket 56 of the protruding pillar of the adjusting mount 52 to adjust a distance between the second brake pad 14 and the first brake pad 12.

The minor plate 64 has a forced portion 61. The forced portion 61 has a free end with a hexagonal outline. The main plate 62 is connected to the minor plate 64. The forced portion 61 is mounted through the fixed mount 54 and is inserted in the other one of the two caliper arms 71 that is distal from the first component 20. The forced portion 61 is screwed with another protecting cover 35. A bearing 65 is mounted between the minor plate 64 and the fixed mount 54 to lower coefficient of friction. The first clutch 40 and the second clutch 60 may operate simultaneously by the caliper 16. The six conical recesses 68 are divided into three pairs. Two conical recesses 68 of each pair are respectively formed in the main plate 62 and the minor plate 64 and face to each other. The three rolling balls 66 are respectively retained in the three pairs of conical recesses 68. Each one of the three rolling balls 66 is capable of rotating between the main plate 62 and the minor plate 64.

Figure 6:
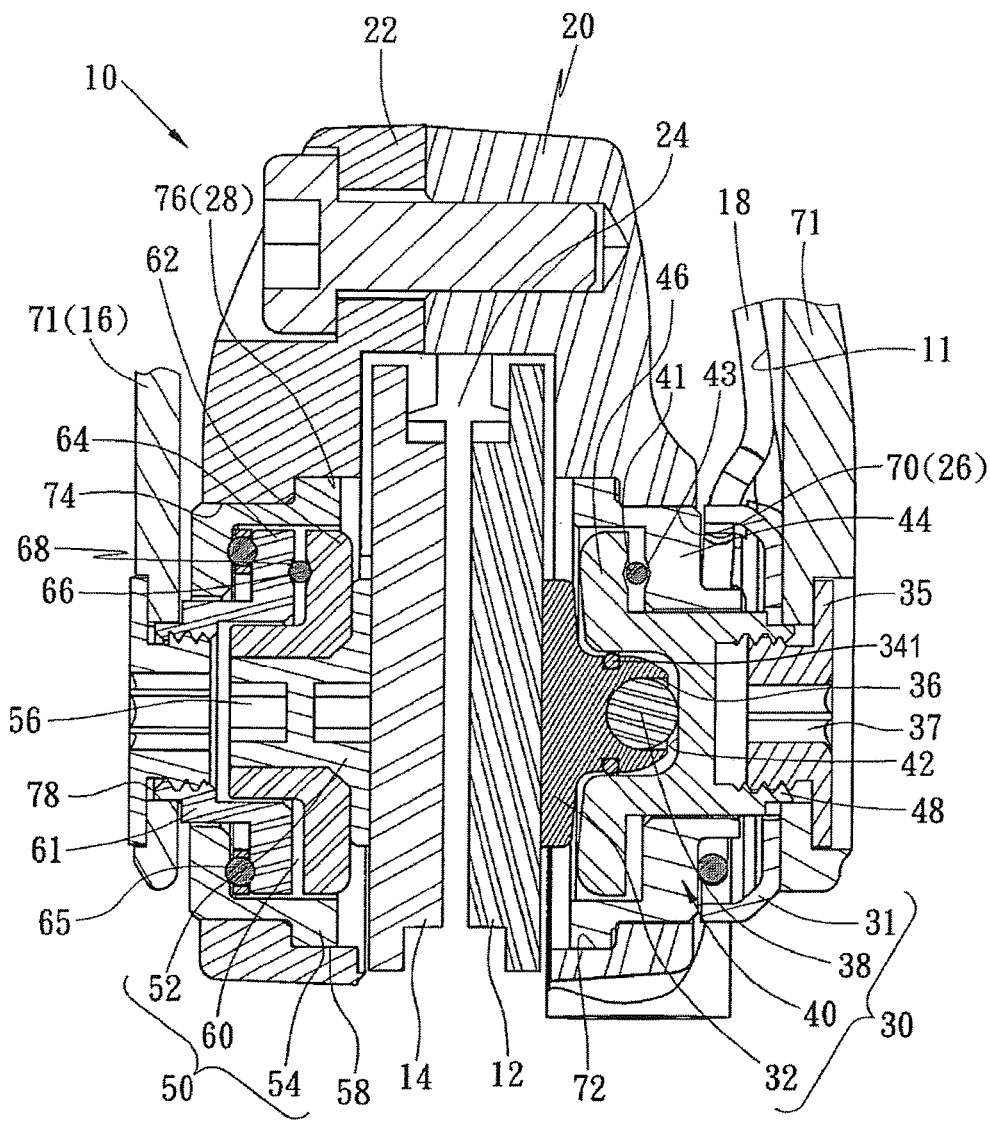
FIG. 6 is an operational cross sectional side view of the disk brake device in FIG. 1.
Figure 7:
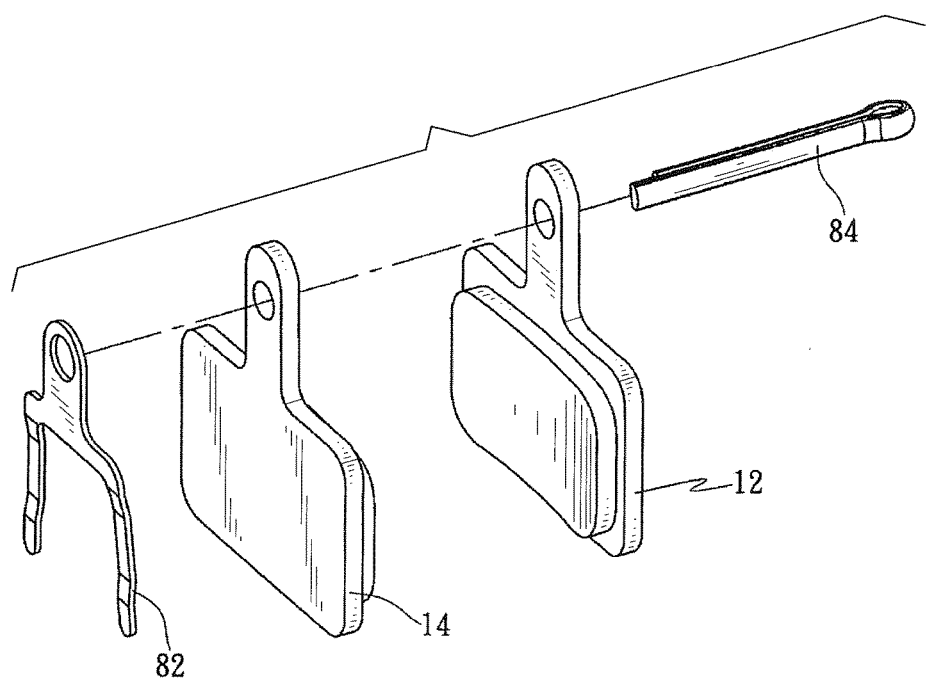
FIG. 7 is another partially exploded perspective view of the disk brake device in FIG. 1.
Figure 8:
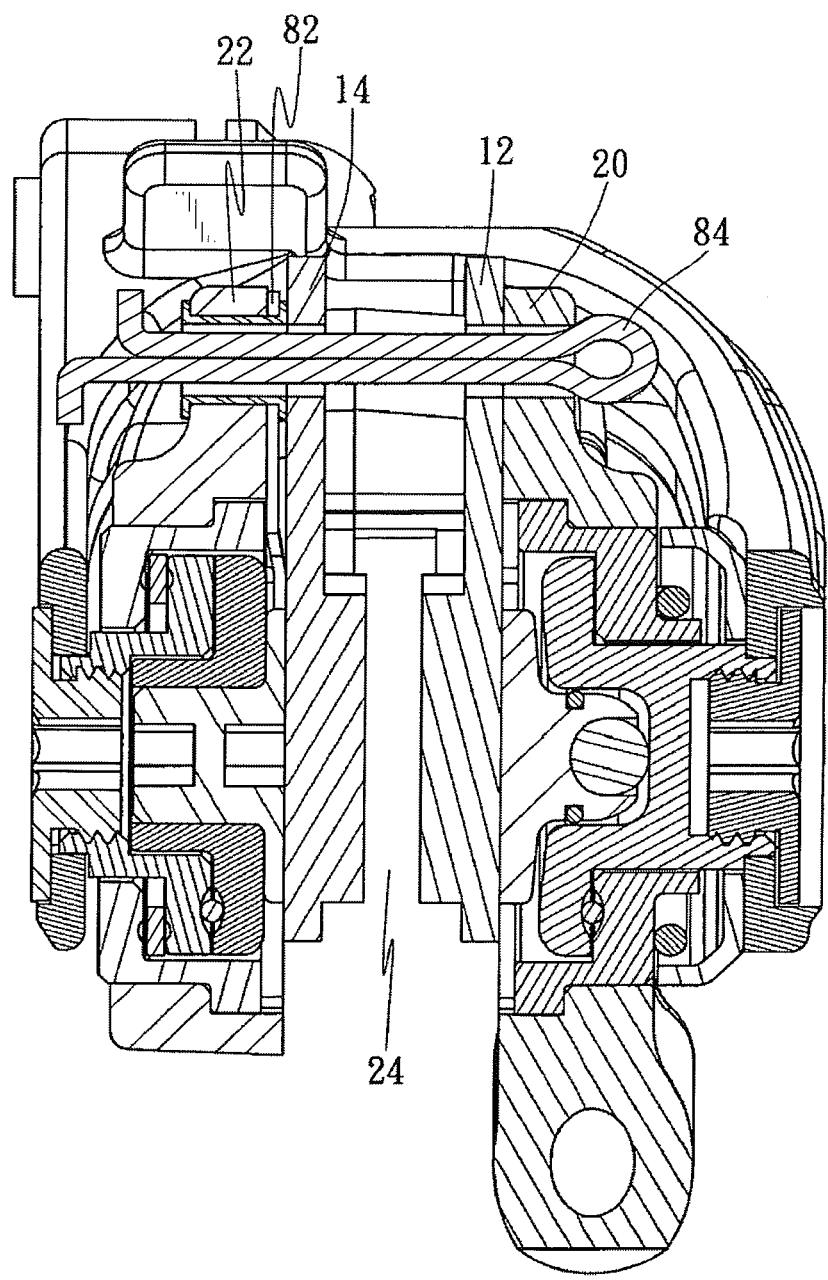
FIG. 8 is an enlarged cross sectional side view of the disk brake device in FIG. 1.

With reference to FIGS. 1, 5, and 6, the caliper 16 rotates in a direction to allow the two caliper arms 71 to drive the feeding shaft 48 of the movable plate 46 and the forced portion 61 of the minor plate 64 to rotate in the same direction. The movable plate 46 rotates relative to the fixed plate 44. The two conical recesses 43 of each pair are not aligned with each other. The movable plate 46 is abutted by the three rolling balls 41 and moves axially toward the second disk pad 14. The movable plate 46 drives the first disk pad 12 to contact the brake disk. The recess 42 of the movable plate 46 contacts the supporting protrusion 34 of the base 32 of the universal set 30 in a point-contact relationship. Furthermore, the ball 38 of the universal set 30 contacts the recess 42 in a point-contact relationship and is able to freely rotate. The first disk pad 12 and the brake disk maintain an optimal face contact, and therefore results in an optimal braking effect and shortens the time period during which the first disk pad 12 contacts the brake disk.

By a similar manner, the minor plate 64 rotates relative to the main plate 62. The main plate 62 is abutted against the three rolling balls 66 and moves axially toward the first disk pad 12 to contact the brake disk. The first disk pad 12 and the second disk pad 14 move toward each other to clamp the brake disk to slow down or stop the brake disk. Then, the caliper 16 rotates reversely, and the two caliper arms 71 of the caliper 16 drive the feeding shaft 48 of the movable plate 46 and the forced portion 61 of the minor plate 64 to rotate reversely. The movable plate 46 moves toward the fixed plate 44. Additionally, the main plate 62 moves toward the minor plate 64. The first disk pad 12 and the second disk pad 14 detach from the brake disk to cancel braking.

Figure 9:
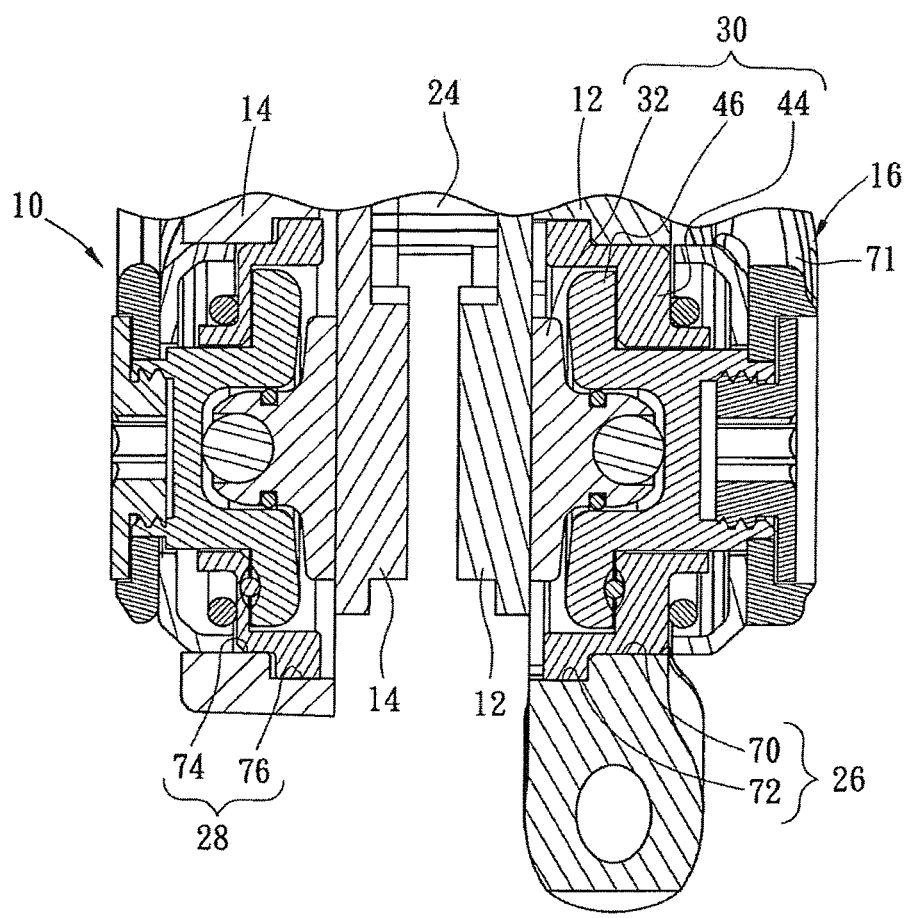
FIG. 9 is an enlarged cross sectional side view of a second embodiment of the disk brake device in accordance with the present invention.

With reference to FIG. 9, a second embodiment of the disk brake device in accordance with the present invention is substantially the same as the first embodiment except for the following features. The second assembling hole 28 of the second component 22 is assembled by another universal set 30 rather than the adjusting unit 50. Said another universal set 30 assembled to the second assembling hole 28 is driven by the caliper 16. The two universal sets 30 are respectively assembled to the first assembling hole 26 and the second assembling hole 28 to drive the first brake pad 12 and the second brake pad 14 to contact or detach from the brake disk.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A disk brake device with a disk pad guiding structure comprising:
   a first component having
      an axial direction; and
      a first assembling hole axially formed through the first component;
   a universal set mounted in the first assembling hole and having
      a base having a supporting protrusion; and
      a first clutch having
         a fixed plate having
            a flange having a non-circular outline, embedded in, and fixed to the first assembling hole; and
            a movable plate capable of axially reciprocating and having
               a feeding shaft mounted through the fixed plate; and
               a recess facing to the base and mounted on the supporting protrusion, contacting the supporting protrusion in a point-contact relationship, and supported by the supporting protrusion;
   a second component fastened to the first component and having
      a clamping space formed between the first component and the second component;
      a second assembling hole formed through the second component, coaxially aligned with the first assembling hole, and assembled by a second clutch; and
   a caliper mounted across the first component and the second component;
   the caliper having two caliper arms respectively connected to and driving the first clutch and the second clutch; and
   two disk pads mounted in the clamping space and respectively driven by the first clutch and the second clutch.

2. The disk brake device as claimed in claim 1, wherein the second assembling hole is assembled by an adjusting unit, and the adjusting unit has
   an adjusting mount having a protruding pillar having a socket; and
   a fixed mount having a flange having a non-circular outline, embedded in, and fixed to the second assembling hole; and
   the second clutch is disposed between the adjusting mount and the fixed mount and is screwed with the protruding pillar.

3. The disk brake device as claimed in claim 2, wherein the second clutch has
   a main plate capable of axially reciprocating and screwed with the adjusting mount; and
   a minor plate having a forced portion mounted through the fixed mount.

4. The disk brake device as claimed in claim 3, wherein the two caliper arms of the caliper are respectively connected to the feeding shaft of the first clutch and the forced portion of the second clutch; and
   two protecting covers are respectively screwed with the feeding shaft of the first clutch and the forced portion of the second clutch.

5. The disk brake device as claimed in claim 4, wherein the supporting protrusion has
   a ball socket formed at an end portion of the supporting protrusion and embedded by a ball; and
   the ball protrudes out from the ball socket to contact a plane bottom of the recess and makes the supporting protrusion contact the recess in a point-contact relationship.

6. The disk brake device as claimed in claim 5, wherein an O-ring is mounted on and around a surface of the supporting protrusion and disposed at a middle section of the supporting protrusion; and
   the O-ring contacts an inner surrounding surface of the recess in a linear contact relationship and supports the recess.

7. The disk brake device as claimed in claim 6, wherein the first clutch has
   an elastic unit being a metal strip and having
      a middle section with a C-shaped outline mounted on and around the feeding shaft;
      an axial section connected to the middle section of the elastic unit and functioning as a positioning point of the elastic unit; and
      an operating section connected to the middle section of the elastic unit and to the caliper; and
   a cover mounted on the feeding shaft and covering the elastic unit.

8. The disk brake device as claimed in claim 7, wherein the first component has a first connecting portion;
   the second component has a second connecting portion;
   a riveting unit is hollow and is mounted through the second connecting portion of the second component and an elastic sheet;
   a pin is mounted through the first connecting portion of the first component, the two disk pads, and the riveting unit.

9. The disk brake device as claimed in claim 1, wherein the second assembling hole is assembled by another universal set, and said another universal set has
   a base having a supporting protrusion; and
   the second clutch has
      a movable plate capable of axially reciprocating and having a recess facing to the base of said another universal set, mounted on the supporting protrusion of the base of said another universal set, contacting the supporting protrusion of the base of said another universal set in a point-contact relationship, and supported by the supporting protrusion of the base of said another universal set.

10. The disk brake device as claimed in claim 9, wherein at least one of the two supporting protrusions of the two universal sets has
    a ball socket formed at an end portion of the supporting protrusion and embedded by a ball; and
    the ball protrudes out from the ball socket to contact a plane bottom of the recess and makes the supporting protrusion contact the recess in a point-contact relationship.

11. The disk brake device as claimed in claim 10, wherein an O-ring is mounted on and around a surface of the supporting protrusion and disposed at a middle section of the supporting protrusion;
    the O-ring contacts an inner surrounding surface of the recess in a linear contact relationship and supports the recess.

12. The disk brake device as claimed in claim 11, wherein the first clutch has
    an elastic unit being a metal strip and having
       a middle section with a C-shaped outline mounted on and around the feeding shaft;

an axial section connected to the middle section of the elastic unit and functioning as a positioning point of the elastic unit; and an operating section connected to the middle section of the elastic unit and to the caliper; and a cover mounted on the feeding shaft and covering the elastic unit.

13. The disk brake device as claimed in claim 12, wherein the first component has a first connecting portion;

the second component has a second connecting portion;

a riveting unit is hollow and is mounted through the second connecting portion of the second component and an elastic sheet;

a pin is mounted through the first connecting portion of the first component, the two disk pads, and the riveting unit.

14. The disk brake device as claimed in claim 1, wherein the supporting protrusion has a ball socket formed at an end portion of the supporting protrusion and embedded by a ball; and the ball protrudes out from the ball socket to contact a plane bottom of the recess and makes the supporting protrusion contact the recess in a point-contact relationship.

15. The disk brake device as claimed in claim 1, wherein an O-ring is mounted on and around a surface of the supporting protrusion and disposed at a middle section of the supporting protrusion; and the O-ring contacts an inner surrounding surface of the recess in a linear contact relationship and supports the recess.

16. The disk brake device as claimed in claim 15, wherein the first clutch has an elastic unit being a metal strip and having a middle section with a C-shaped outline mounted on and around the feeding shaft;

an axial section connected to the middle section of the elastic unit and functioning as a positioning point of the elastic unit; and an operating section connected to the middle section of the elastic unit and to the caliper; and a cover mounted on the feeding shaft and covering the elastic unit.

17. The disk brake device as claimed in claim 16, wherein the first component has a first connecting portion;

the second component has a second connecting portion;

a riveting unit is hollow and is mounted through the second connecting portion of the second component and an elastic sheet;

a pin is mounted through the first connecting portion of the first component, the two disk pads, and the riveting unit.

* * * * *